(12) United States Patent
Schofield

(10) Patent No.: US 6,308,225 B1
(45) Date of Patent: *Oct. 23, 2001

(54) METHOD FOR PERFORMING DISTRIBUTED OBJECT CALLS

(75) Inventor: Andrew Schofield, Cham (CH)

(73) Assignee: 724 Solutions, Inc., Toronto (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/678,295

(22) Filed: Jul. 11, 1996

(51) Int. Cl.$^7$ ........................................................ G06F 9/54
(52) U.S. Cl. .............................................................. 709/316
(58) Field of Search ................... 395/684; 709/310–332, 709/200–253

(56) References Cited

U.S. PATENT DOCUMENTS 5,511,197 * 4/1996 Hill et al. .............................. 709/328

OTHER PUBLICATIONS

OMG, "ORB Products", pp. 299–326, Jul. 1995.*
OMG, Common Object Request Broker: Architecture and Specification, Revision 2.0, Jul. 1995.*
CORBA V2.0, Chaps 1–4 Jul. 1995.*

* cited by examiner

Primary Examiner—St.-John Courtenay, III
(74) Attorney, Agent, or Firm—Thompson & Knight LLP

(57) ABSTRACT

A method for making distributed object calls from client applications to server applications is disclosed. In particular, the method of the present invention involves generating a data structure that contains information about the available IDL-defined interfaces and their related operations. An application loaded in the client computer then packs a request containing information about a specific operation of an interface into a message buffer in the client computer according to a predetermined format specified in the request. The message buffer is then sent to a server computer that unpacks the request from the message buffer based upon the predetermined format. The server processes the request and responds by packing its response into a message buffer according to a predetermined format. The message buffer is then transported to the client computer that unpacks the response from the message buffer.

16 Claims, 8 Drawing Sheets

METHOD FOR PERFORMING DISTRIBUTED OBJECT CALLS

RELATED APPLICATIONS

The following related U.S. applications are hereby incorporated by reference: U.S. application Ser. No. 08/680,270 entitled "Method and Apparatus for Describing an Interface Definition Language-Defined Interface, Operation, and Data Type" by A. Schofield, filed Jul. 11, 1996, now abandoned U.S. application Ser. No. 08/678,681 entitled "Method and Apparatus Using Parameterized Vectors For Conerting Interface Definition Language-Defined Data Structures Into a Transport and Platform-Independent Format" by A. Schofield, filed Jul. 11, 1996; U.S. application Ser. No. 08/678,298 entitled "Data Structure Representing An Interface Definition Language Source File" by A. Schofield, filed Jul. 11, 1996; U.S. application Ser. No. 08/680,203 entitled "Method and Apparatus for Transporting Interface Definition Language-Defined Data Structures Between Heterogeneous Systems" by A. Schofield, filed Jul. 11, 1996 now U.S. Pat. No. 5,860,072; U.S. application Ser. No. 08/678,295 entitled "Method and Apparatus for Performing Distributed Object Calls" by A. Schofield filed Jul. 11, 1996; U.S. application Ser. No. 08/680,202 entitled "Method and Apparatus for Asynchronously Calling and Implementing Objects" by A. Schofield, filed Jul. 11, 1996; U.S. application Ser. No. 08/680,266 entitled "Method and Apparatus for Performing Distributed Object Calls using Proxies and Memory Allocation" by A. Schofield filed Jul. 11, 1996.

BACKGROUND OF THE INVENTION

1. Field of the Invention

The present invention relates to a new method for performing distributed object calls. Specifically, the present invention allows client and server applications to communicate via generic function calls without relying upon the specific transport mechanism utilized by a commercial object request broker.

2. Background

Distributed object computing combines the concepts of distributed computing and object-oriented computing. Distributed computing consists of two or more pieces of software sharing information with each other. These two pieces of software could be running on the same computer or on different computers connected to a common network. Most distributed computing is based on a client/server model. With the client/server model, two major types of software are used: client software, which requests the information or service, and server software, which provides or implements the information or service.

Object-oriented computing is based upon the object model where pieces of code called "objects"—often abstracted from real objects in the real world—contain data and may have actions (also known as "operations") performed on them. An object is defined by its interface ("class" in C++ parlance). The interface defines the characteristics and behavior of a kind of object, including the operations that can be performed on objects of that interface and the parameters to that operation. A specific instance of an object is identified within a distributed object system by a unique identifier called an object reference.

In a distributed object system, a client application sends a request (or "invocation" or "object call") to a server application containing an indication of the operation to be performed on a specific object, the parameters to that operation, the object reference for that object, and a mechanism to return error information (or "exception information") about the success or failure of a request. The server application receives the request and carries out the request via a server "implementation." The implementation satisfies the client's request for an operation on a specific object. The implementation includes one or more methods, which are the portions of code in the server application that actually do the work requested of the implementation. If the implementation is carried out successfully, the server application returns a response to the client, if necessary. The server application may also return exception information.

To standardize distributed object systems, the Object Management Group ("OMG"), a consortium of computer software companies, proposed the Common Object Request Broker Architecture ("CORBA"). Under the CORBA standard, an Object Request Broker ("ORB") provides a communication hub for all objects in the system passing the request to the server and returning the response to the client. Commercial ORB's are known in the art and a common type is IBM's System Object Model ("SOM"). On the client side, the ORB handles requests for the invocation of a method and the related selection of servers and methods. When an application sends a request to the ORB for a method to be performed on an object, the ORB validates the arguments contained in the request against the interface for that object and dispatches the request to the server, starting it if necessary. On the server side, the ORB uses information in the request to determine the best implementation to satisfy the request. This information includes the operation the client is requesting, what type of object the operation is being performed on, and any additional information stored for the request. In addition, the server-side ORB validates each request and its arguments. The ORB is also responsible for transmitting the response back to the client.

Both the client application and the server application must have information about the available interfaces, including the objects and operations that can be performed on those objects. To facilitate the common sharing of interface definitions, OMG proposed the Interface Definition Language ("IDL"). IDL is a definition language (not a programming language) that is used to describe an object's interface; that is, the characteristics and behavior of a kind of object, including the operations that can be performed on those objects.

IDL interfaces define a set of operations that a client can invoke on an object. An interface can declare one or more exceptions, which indicate that an IDL operation did not perform successfully. Operations may receive parameters and return a return value. Each parameter to an operation may have a "direction" that indicates whether the value is passed from client to server as an input parameter ("in"), from server to client as an output parameter ("out"), or in both directions as an input/output parameter ("inout"). The parameter also has a data type that constrains its possible values. Operations may also optionally have a "one-way" attribute, which specifies which invocation semantics the communication service must provide for invocations of a particular operation. When a client invokes an operation with the one-way attribute, the invocation semantics are "best-effort", implying that the operation will be implemented by the server at most once. If an attempt to implement the operation fails, the server does not attempt to implement the operation again. An operation with the one-way attribute must specify a void return type and must not contain any output parameters.

Data types are used to describe the accepted values of IDL operation parameters, exceptions, and return values. IDL supports two categories of data types: basic and compound. Basic types include short integers, long integers, long long integers, unsigned long integers, unsigned short integers, floating points, double, character, boolean, and octet. Compound types include enum, string, struct, array, union, sequence, and "any" types. The struct type is similar to a C structure; it lets interface designers create a complex data type using one or more type definitions. The sequence type lets interface designers pass a variable-size array of objects. The "any" type can represent any possible data type—basic or compound.

IDL is designed to be used in distributed object systems implementing OMG's CORBA, Revision 2.0 specification, which is incorporated by reference herein. In a typical system implementing the CORBA specification, interface definitions are written in an IDL-defined source file (also known as a "translation unit"). The source file is compiled by an IDL compiler that generates programming-language-specific files, including client stub files, server stub files, and header files. Client stub files are language-specific mappings of IDL operation definitions for an object type into procedural routines, one for each operation. When compiled by a language-specific compiler and linked into a client application, the stub routines may be called by the client application to invoke a request. Similarly, the server stub files are language-specific mappings of IDL operation definitions for an object type (defined by an interface) into procedural routines. When compiled and linked into a server application, the server application can call these routines when a corresponding request arrives. Header files are compiled and linked into client and server applications and are used to define common data types.

Current commercial CORBA-compliant ORBs, however, require clients and servers to utilize a particular transport mechanism, such as TCP/IP. Sun Microsystem's Distributed Objects Everywhere, for instance, runs on Sun platforms using TCP/IP as its underlying protocol. IBM's System Object Model provides support for TCP/IP, IPX/SPX, and NetBIOS. Expersoft's XShell supports only TCP/IP. This reliance upon a particular protocol limits the ability of heterogeneous systems to communicate. This protocol-dependence limits the ability of an enterprise to incorporate legacy systems into its distributed object system.

Accordingly, there is a need for a method for making transport-independent distributed object calls.

SUMMARY OF THE INVENTION

The present invention satisfies the need for a method for making transport-independent distributed object calls from a client application to a server application. Specifically, the method of the present invention involves generating an ASCII string description of an interface and creating a data structure from the ASCII string that contains information about the interface and its related operations. Both the server and the client generate the interface data structure for their respective supported interfaces. The interface data structure contains, for each operation in the interface, an operation data structure containing information about the data structure. The operation data structure includes an integer derived from the string description of the interface and an identifier derived from the IDL name of the operation. The client application generates a request data structure containing the interface data structure and input arguments to an operation. The request data structure is packed into a message buffer and transported to the server application.

The server application may be loaded in the same computer as the client application. The server computer extracts the request from the message buffer and implements the requested operation. The server responds to the client by generating a response data structure containing the server's interface data structure and any output arguments into a response data structure. The response data structure is packed into a message buffer and transported to the client application.

The functions that enable this method can be called directly from the client application, thus giving the developer greater control over the application and its associated object calls. Moreover, by packing the data in a predetermined format known to both client and server, the object call is independent of transport. In addition, the separation of request and response allows the client application to continue performing other functions before a response arrives. The server can also use the unique integers contained in the operation data structure to determine which method in the server application to invoke.

A more complete understanding of the method for performing distributed object calls will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

I. System Overview

Reference will now be made in detail to the preferred embodiments of the invention, examples of which are illustrated in the accompanying drawings. Wherever possible, the same reference numbers will be used throughout the drawings to refer to the same or like parts.

Figure 1:
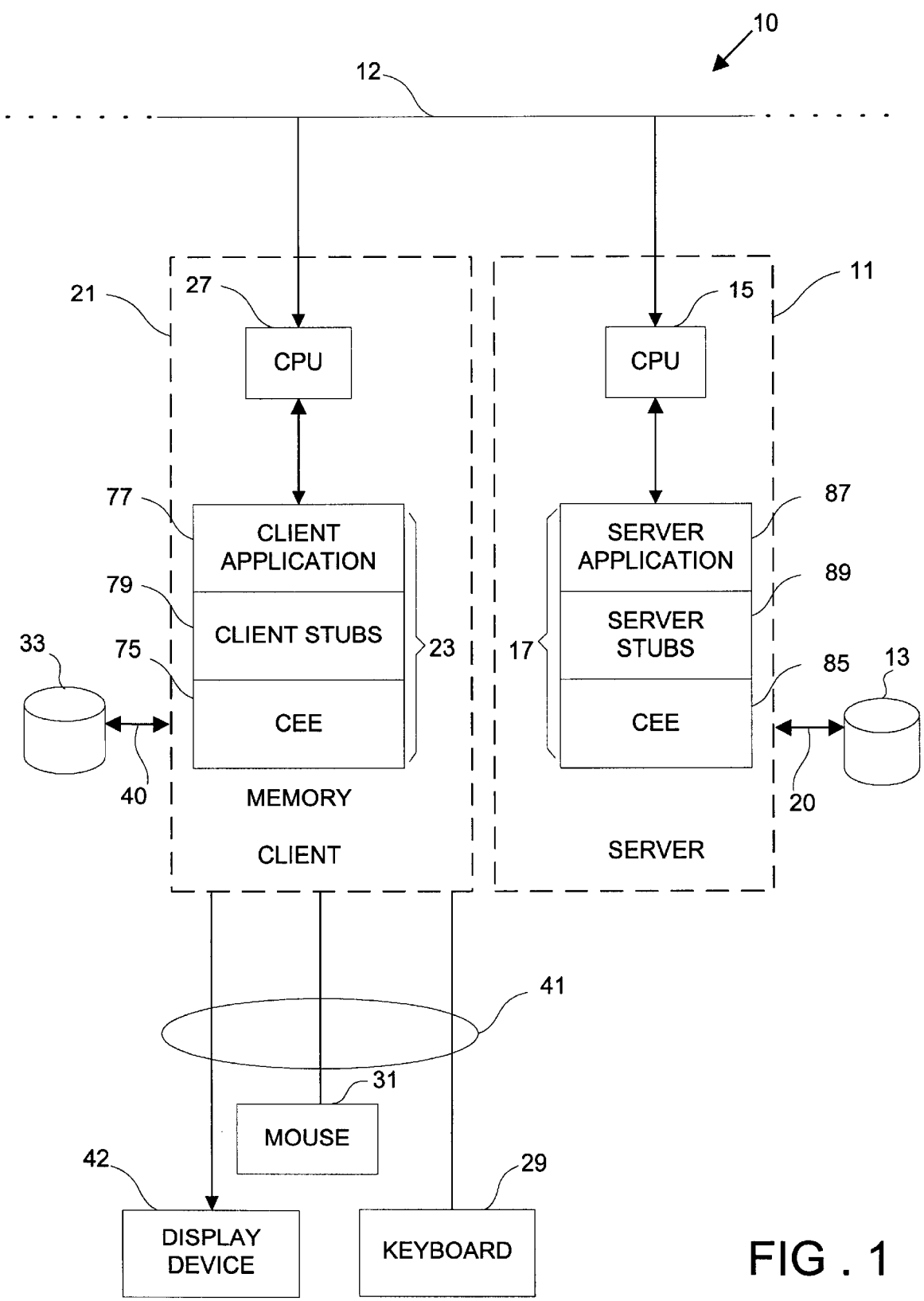
FIG. 1 is a diagram of a distributed computing environment using the method or apparatus of the present invention.

As illustrated in FIG. 1, the method of the present invention is designed for use in a distributed (client/server) computing environment 10. The client and server systems are connected by network connections 12, such as internet connections or the connections of a local area network. A server computer 11 communicates over a bus of I/O channel 20 with an associated storage subsystem 13. The server system 11 includes a CPU 15 and a memory 17 for storing current state information about program execution. A portion of the memory 17 is dedicated to storing the states and variables associated with each function of the program which is currently executing on the client computer. The client computer 21 similarly includes a CPU 27 and associated memory 23, and input devices, such as a keyboard 29 or a mouse 31 and a video display terminal ("VDT") 33. The client CPU communicates over a bus or I/O channel 40 with a disk storage subsystem 33 and via I/O channel 41 with the keyboard 29, display device 42 and mouse 31.

The server computer memory 17 further includes a server application 87 and server stubs 89 for implementing an operation on an object. The client computer memory 23 includes a client application 77 and client stubs 79 for requesting that an operation be performed on an object. Both the client and server memories may further include a Common Execution Environment ("CEE") 75, 85, as discussed below.

The client/server model as shown in FIG. 1 is merely demonstrative of a typical client/server system. Within the context of the present invention, the "client" is an application that requests services while the "server" is an application that implements the requested service. Indeed, both the client and server application may reside on the same computer and within a common capsule, as discussed below. Most likely, however, the client and server application will reside on separate computers using different operating systems.

II. Execution Environment

The method and apparatus of the present invention use a set of routines, the Graceland Utilities ("GLU") to pack and unpack request and response data structures that are transported between heterogeneous clients and servers. In particular, the client calls a GLU function to pack a request data structure containing a request to perform an operation on an object. The server calls a GLU function to unpack the request and to pack a response data structure to be sent back to the client. GLU routines, in turn, call routines from the Presentation Conversion Utilities ("PCU") to efficiently pack request and response data structures before these structures are transported. The PCU functions are described in U.S. application Ser. No. 08/680,203.

Figure 2:
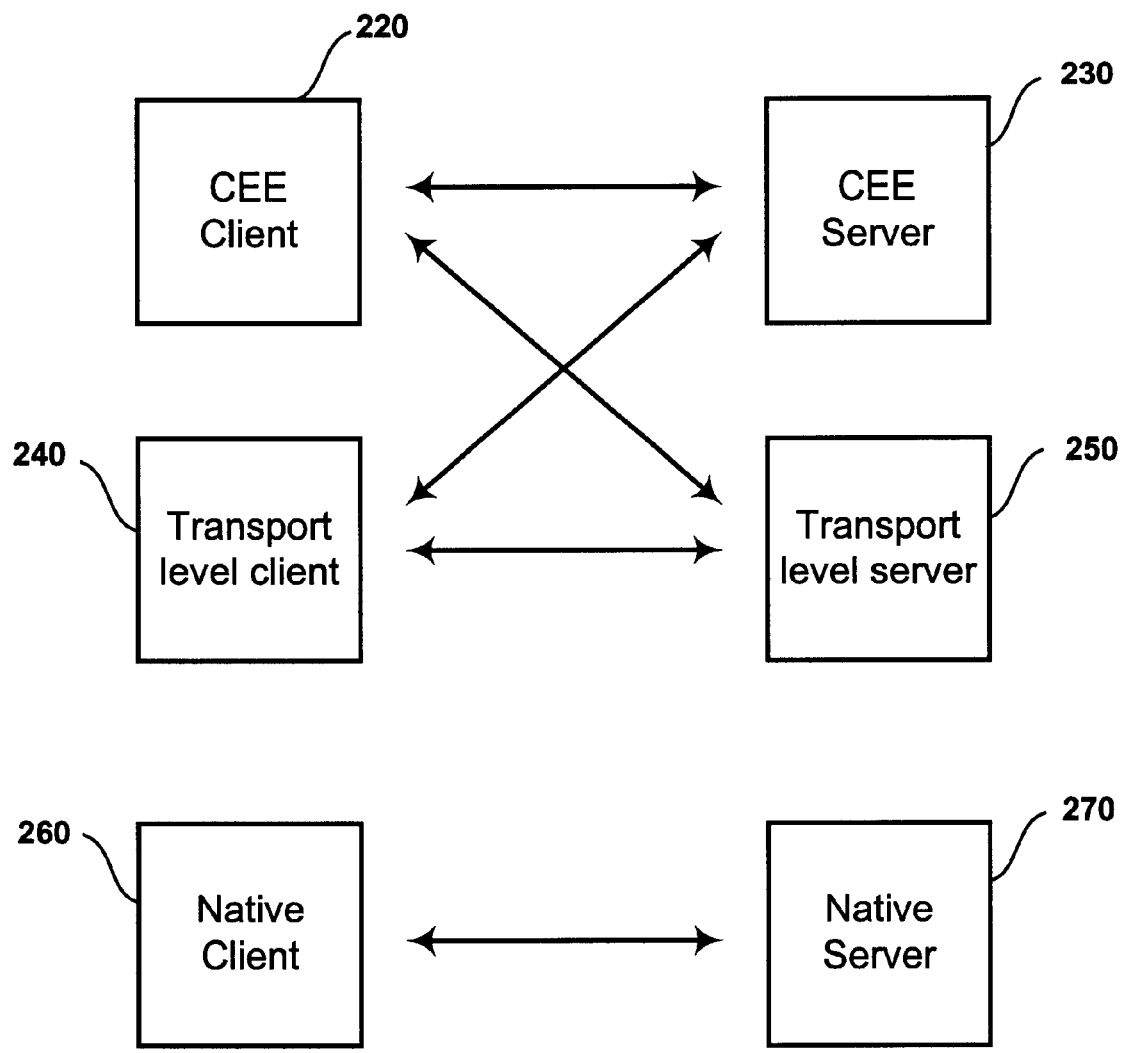
FIG. 2 is a diagram of the various methods of communication between clients and servers.

GLU may be utilized within any distributed computing environment. FIG. 2 shows how client and servers may communicate with each other. In a preferred embodiment, the Common Execution Environment ("CEE"), which is a component of the Tandem Message Switching Facility ("MSF") Architecture is utilized. The call from a CEE client 220 to a CEE server 230 is made using generated client and server stubs. If both the client and server applications communicate using the CEE, the calls to GLU functions are not visible to the client and server applications. Instead, the client calls the CEE using generated stub functions. The CEE infrastructure will use GLU if the object call crosses capsule boundaries. A CEE server application 230 may also be called directly at port level 240 by using GLU functions. Similarly, CEE clients 220 may call port level servers 250 which may use GLU to unpack requests and pack responses. As an alternative to down-calling routines directly from the CEE, client and server applications 260, 270 may communicate directly using GLU functions, as shown in item 209 in FIG. 2.

Figure 3A:
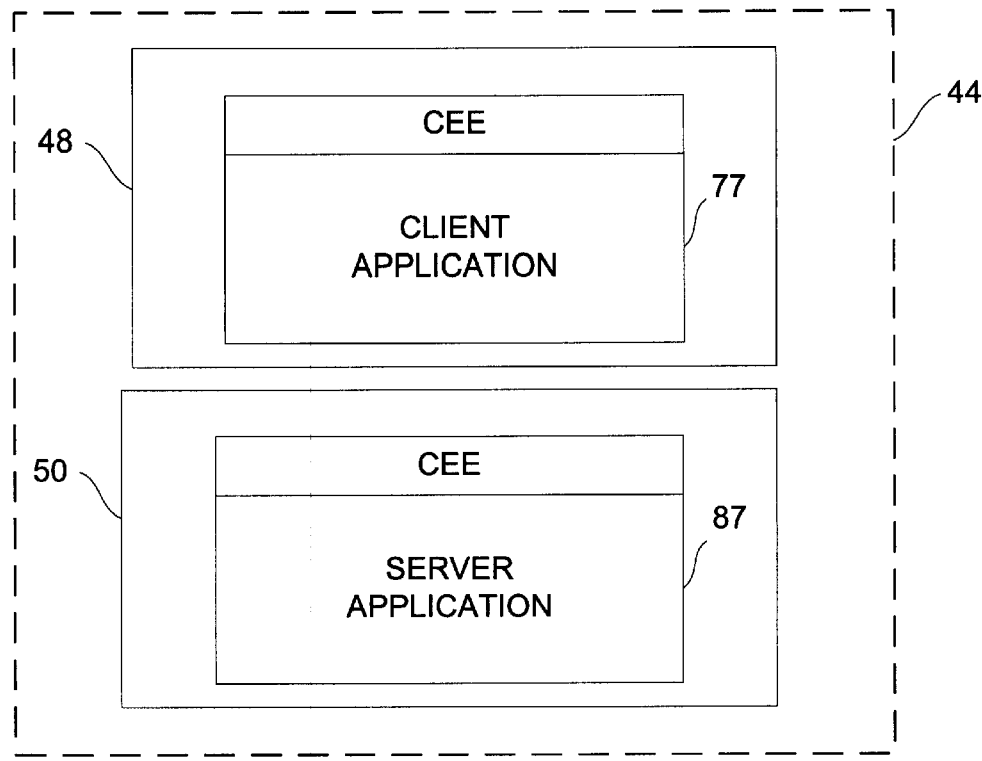
FIGS. 3a and 3b are diagrams of Common Execution Environment configurations
Figure 3B:
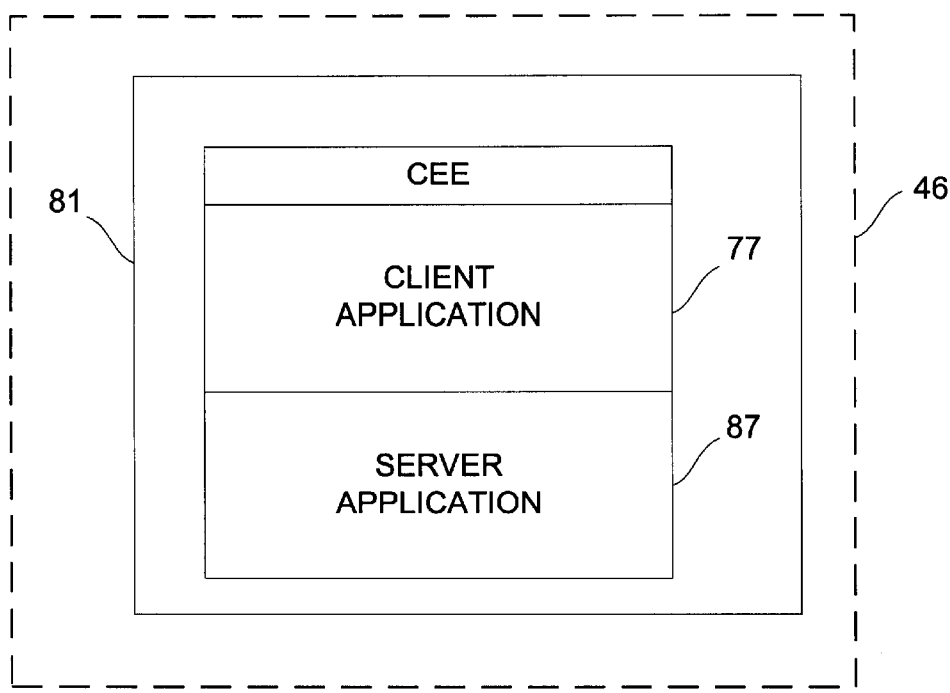

The CEE uses a "capsule" infrastructure. A capsule encapsulates memory space and execution stream. A capsule may be implemented differently on different systems depending upon the operating system. For instance, on certain systems, a capsule may be implemented as a process. On other systems, the capsule may be implemented as a thread. Moreover, client and server applications may be configured within different capsules contained on different machines as shown in FIG. 1. Alternatively, the different capsules may be configured as shown in FIGS. 3a and 3b. FIG. 3a shows a client application 77 loaded in a single capsule 48 and a server application 87 loaded in a separate capsule 50. Both capsules, however, are stored in the same machine 44. Both the client and server applications may also be loaded within a single capsule 81 on the same machine 21 as shown in FIG. 3b.

Client and server applications invoke object initialization code and object methods. One or more of these objects are grouped into Implementation Libraries which are loaded into a CEE capsule as required. The CEE then calls the object's methods to satisfy object calls. These methods may, in turn, call routines provided by the CEE to perform calls to other objects within the same or another capsule.

Figure 4:
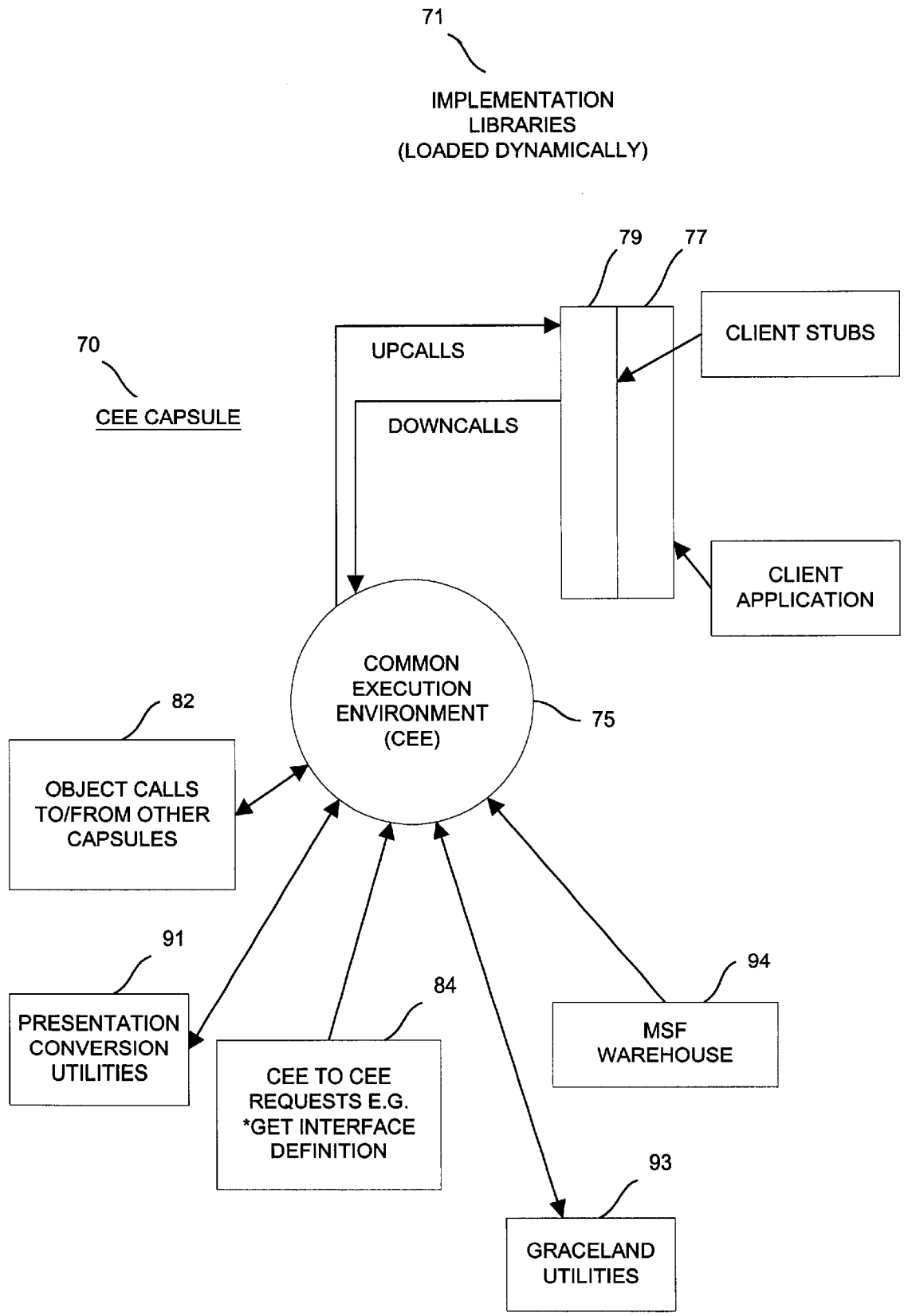
FIG. 4 is a diagram of a Common Execution Environment capsule.

FIG. 4 shows a CEE capsule 70 that includes certain of the core CEE components and implementations of objects contained within the Implementation Libraries. The Implementation Libraries include client applications 77, and stubs 79 generated from the IDL specification of the object's interface. Implementation Libraries may contain application objects, infrastructural objects that supply object services or objects used internally by the CEE 75. The applications 77 and the CEE 75 interact through the down-calling of routines supplied by the CEE and the up-calling of routines contained in the application's Implementation Library. The CEE includes numerous libraries of routines that can be down-called from client and server applications. The Graceland Utilities ("GLU") 93 and the Presentation Conversion Utilities ("PCU") 91 are libraries of routines utilized in the method of the present invention. These routines are used to facilitate communication between heterogeneous client and server objects.

Objects implemented in a CEE capsule may be configured or dynamic. Configured objects have their implementation details stored in a repository (such as the MSF Warehouse 94) or in initialization scripts. Given a request for a specific object reference, the CEE 75 starts the appropriate capsule based on this configuration data. The capsule uses the configuration data to determine which implementation library to load and which object initialization routine to call. The object initialization routine then creates the object. Dynamic objects are created and destroyed dynamically within the same capsule. Dynamic objects lack repository-stored or scripted configuration information.

The following paragraphs describe a system-level view of how the application interacts with the CEE 75. The CEE 75 implements requests to activate and deactivate objects within a capsule. In addition, the CEE facilitates inter-capsule object calls 82 as well as requests from other CEE's 84. Object activation requests arise when an object call from a client or server application must be satisfied. To activate an object, the CEE loads the implementation library containing the object's methods and then calls a configured object initialization routine. The initialization routine specifies which interface it supports and registers the entry points of the object's methods to be called by the CEE at a later time. The CEE loads the library and then calls the application object's initialization routine.

When the client and server systems start, the CEE runs its own initialization. This initialization tells client and server CEE's where to locate the various Implementation Libraries. Once located by the CEE, the initialization routines in the client and server applications are called. The initialization routines contained in the client and server applications must first carry out any required application-specific initialization. Next, both the client and server initialization routines down-call a CEE function (contained in a dynamic library as stated above) called CEE_INTERFACE_CREATE to specify the object's interface. The interface description is normally generated from an IDL description of the interface contained in an IDL source file, as discussed below. CEE_INTERFACE_CREATE creates an interface and returns a handle to the newly created interface. The handle is a unique identifier that specifies the newly-created interface. The server application initialization routine then uses the interface handle to down-call CEE_IMPLEMENTATION_CREATE. CEE_IMPLEMENTATION$_{13}$CREATE creates an implementation description that can be used by one or more objects. CEE_IMPLEMENTATION_CREATE returns an implementation handle that is a unique identifier specifying the implementation for each operation in the interface. Finally, the server application initialization routine uses the implementation handle to call CEE_SET_METHOD and specifies the actual addresses of specific method routines of the implementation as contained in the server application. The CEE then has sufficient information to connect object calls in the client application to specific methods in the server application.

III. Compilation and Linking of IDL Source Files

Figure 5:
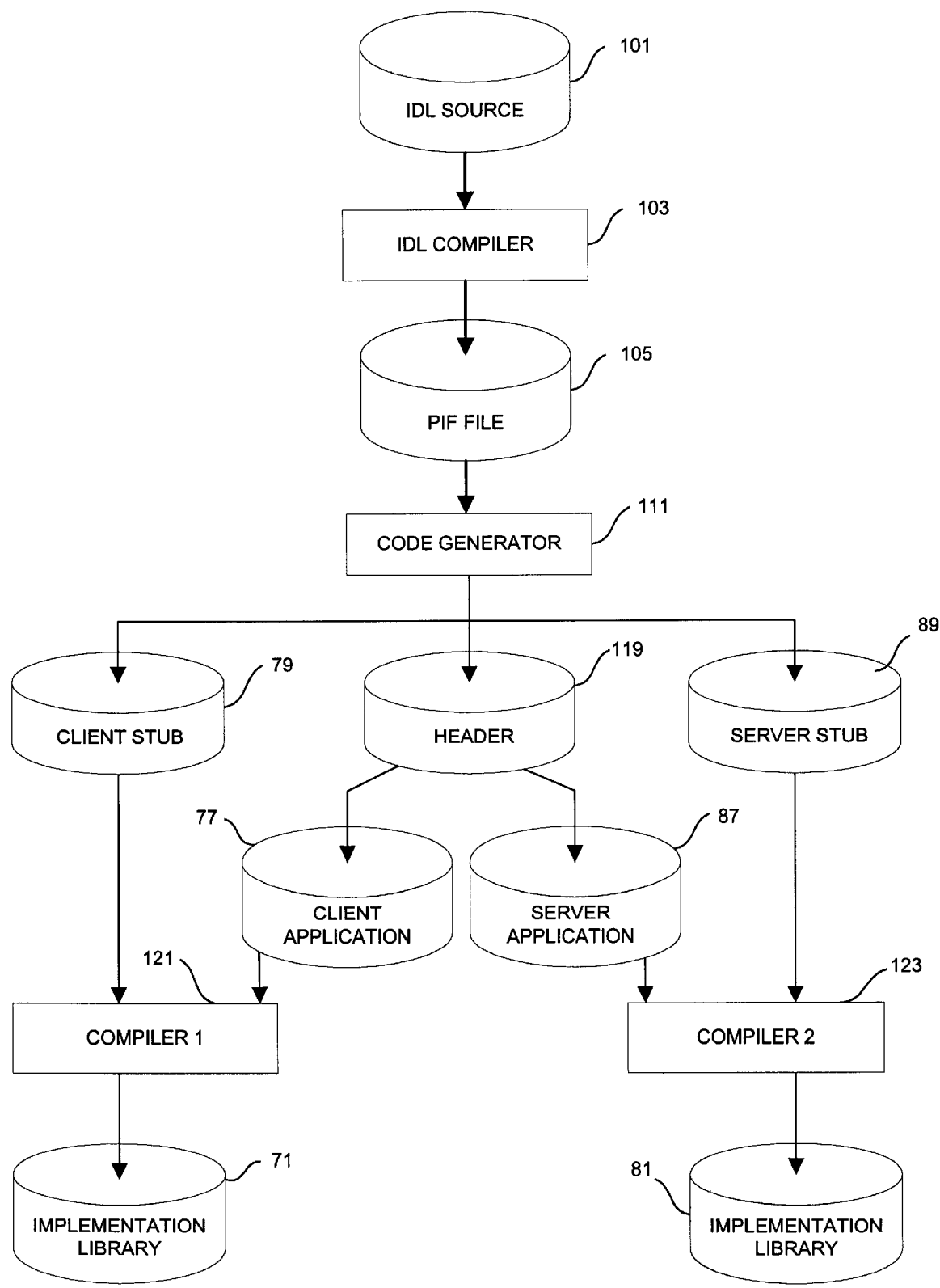
FIG. 5 is a diagram showing the linking and compilation of IDL source files.

FIG. 5 shows how IDL source files are compiled and linked into client and server applications that will utilize the method and apparatus of the present invention. First, an IDL source file 101 is prepared containing IDL interface definitions. An IDL compiler 103 compiles the source file 101. The IDL compiler 103 parses the code 101 to produce a Pickled IDL file ("PIF") file 105 for storage of the compiled source code. A code generator 111 then parses the PIF file. The code generator 111 generates files in the language of the client and server applications. If the client and server applications are in different languages, different code generators are used. Preferably, the code generator 111 and IDL compiler 103 may be combined in a single application to produce language-specific code. The code generator 111 produces a client stub file 115 containing client stub functions and a server stub file 117 containing definitions for object implementations. The client stub functions include synchronous and asynchronous calls to the CEE. The client stub file 115 and the server stub file 117 are compiled by programming language-specific compilers 121, 123 to produce compiled client stub object code and compiled server stub object code. Similarly, a client application 77 and a server application 87 are compiled by programming-language-specific compilers to produce compiled client application object code and compiled server application object code. The client application 121 and the server application 123 also include a header file 119 generated by the code generator 111. The header file 119 contains common definitions and declarations. Finally, the compiler 121 links the client application object code and the client stub object code to produce an implementation library 71. Similarly, a second compiler links the server application object code server stub object code to produce another implementation library 81.

In addition, the header file 119, the client stub file 79, and the server stub file 89 include a compact version of each IDL-defined data structure termed Compact IDL Notation ("CIN"). CIN is an ASCII (or other character-based) representation of an IDL data structure utilizing a special notation. The CIN descriptor is contained in the header file 119 which is included by both the client application 123 and the server application 123. The descriptor is also contained in the client and server stub files as well. Since both the client and server applications 121, 123 have access to the CIN, the generic functionality provided by the GLU library 130 can be used by heterogeneous client and server applications. The creation of CIN by the code generator is described in U.S. application Ser. No. 08/680,270, which is attached as Appendix B.

If the CEE is not used, the code generator 111 generates, in the header file, request and response data structures for each operation contained in each interface of the source file. The request data structure contains the input and input/output parameters to the operation. The response data structure contains the function result, output parameters, and input/output arguments to the requested operation. The code generator 111 also generates a unique integer constant to identify the operation within the interface (an "operation idx").

IV. GLU Functions

The GLU functions of the present method are used to pack and unpack requests made by client applications and responses made by server applications. GLU calls lower-level PCU functions. Packing and unpacking requests is described in U.S. application Ser. No. 08/680,203, filed Jul. 11, 1996. The client and server applications need not be based on the same IDL source, however. For a client and server to be compatible, the operation in question must have the same IDL name, parameters, parameter types, exceptions and context specifiers. The number and sequence of the operations within the interface are irrelevant.

Now, the functions used in the method of the present invention will be described. The method and apparatus of the present invention is implemented by utilizing a group of generic functions or routines that are available to the client and server applications at run-time. As stated above, these routines are intended to be used in conjunction with the CIN generated by the code generator 111. If the functions are called directly from non-CEE client and server applications, the functions utilized are GLU_INTERFACE_PREPARE, GLU_CLIENT_REQUEST_PACK, GLU_SERVER_REQUEST_UNPACK, GLU_SERVER_RESPONSE_PACK, AND GLU_CLIENT_RESPONSE_UNPACK.

The function GLU_INTERFACE_PREPARE is used to prepare a given CIN description of an interface (as generated by the code generator 111) for efficient use by the remaining functions. The "prepared CIN" is used by most of the functions of the method of the present invention. Both the client and the server applications have a copy of their respective CINs. The client and server may differ, however, in the number and type of operations contained in their respective interfaces. The data structure generated in the call to GLU_INTERFACE_PREPARE allows the client and server to be compatible provided that the a requested operation has the same name, parameters, parameter types, exceptions, and context specifiers. The number of operations in the interface and the sequence of the operations within an interface are not considered. Both client and server call GLU_INTERFACE_PREPARE. Preferably, this function call is made once during the initialization portions of each application. GLU_INTERFACE_PREPARE is defined as follows:

| GLU_INTERFACE_PREPARE ( | | |
|---|---|---|
| In | const char | *cinbuf, |
| In | long | cinlen, |
| In | long | max_prep_len, |
| Out | void | *prep); |

The client application provides three input parameters to the function. The first parameter, cinbuf is a pointer to the address in memory containing the CIN description of the interface as generated by code generator 111. The size of the CIN description contained in cinbuf is specified by cinlen (e.g., using a sizeof(cin) function in C). The maximum number of bytes that can be accommodated in the buffer to hold the prepared CIN is specified by max_prep_len. Finally, the function returns the prepared CIN in the address pointed to by prep.

Figure 6:
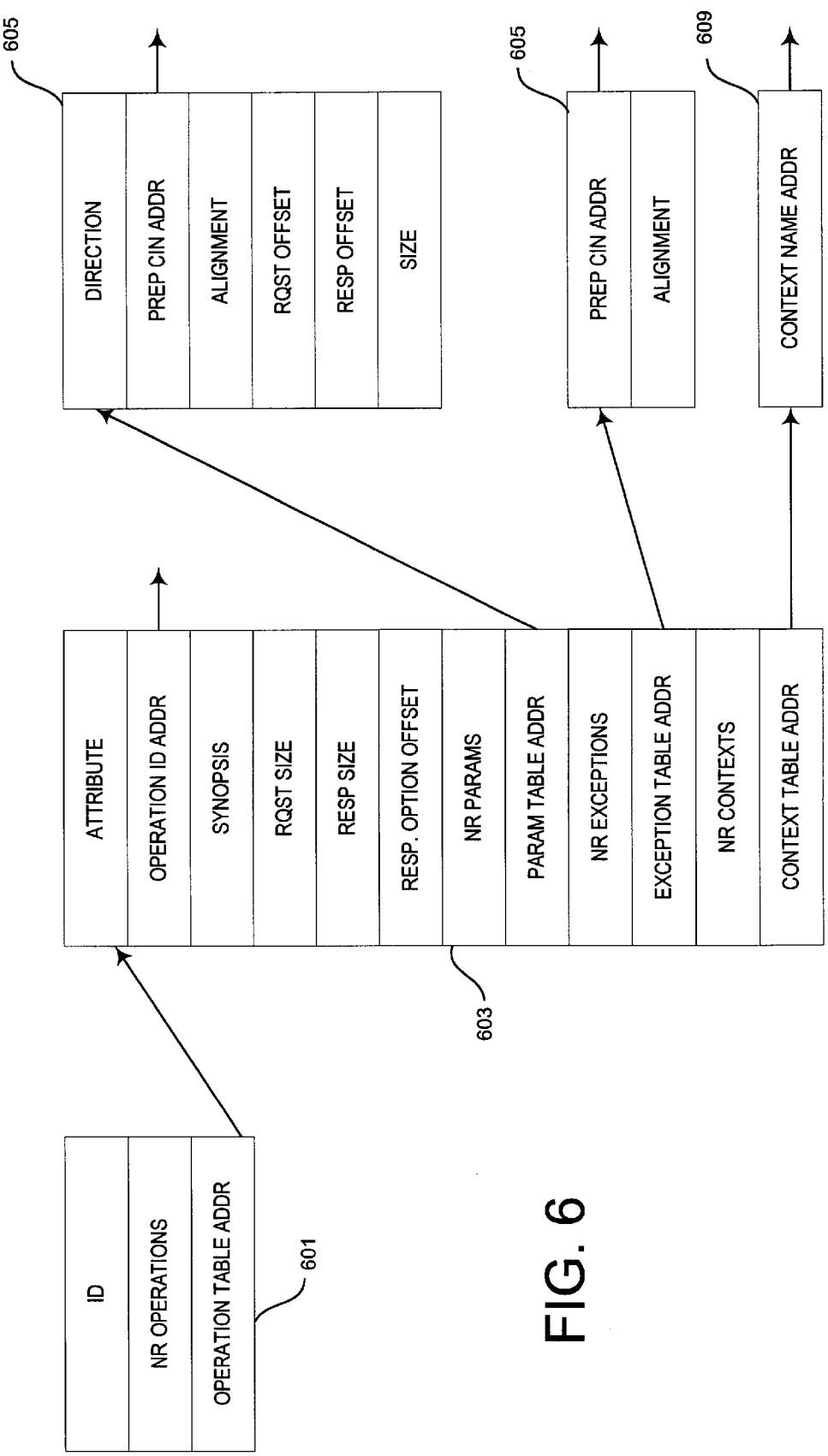
FIG. 6 is a diagram of interface, operation, parameter, context, and exception data structures.

GLU_INTERFACE_PREPARE returns the prepared CIN, which is a data structure 601, as shown in FIG. 6. The intf structure 601 contains the description of an interface in a convenient form as derived from the interface's CIN descriptor. The intf structure contains the following fields:

id;
nr_operations;
*oper_table;

The id member contains a value that is used as a "sanity check" to ensure that prepared interfaces passed to the remaining functions were generated by GLU_INTERFACE_PREPARE. The nr_operations member specifies the number of operations in the interface. The oper_table member points to an array of oper structures 603, each structure describing an operation of the interface.

An oper structure 603 describes an operation supported by an interface. Contents of the table are derived from the CIN description of the interface. The oper structure contains the following fields:

attr;
*id;
synopsis;
req_size;
rsp_size;
nr_params;
*param_table;
nr_exceptions;
*except_table;
nr_contexts;
*context_table The attr member is the operation's IDL attribute that indicates whether or not a response is required by the sender (oneway, e.g.). The synopsis member is a fairly unique integer derived by performing a cyclic redundancy check on the original CIN description of the operation. Each operation will have a different synopsis value, depending upon the number and type of parameters. The id parameter contains a string description of the operation derived from the name of the operation, as defined in IDL. The id parameter is preferably a capitalized version of the operation's name. The req_size member is the size of the request message structure with padding bytes included but without appendages. The rsp_size member is the size of the response message structure with padding but without appendages. The nr_params member is the number of parameters taken by the operation. The param_table pointer points to an array of param structures 304, as defined below. Each param structure defines a parameter contained in the operation. The nr_exceptions member is the number of exceptions that can be raised by the operation. The except_table member points to an array of except structures, as defined below, each of which describes an exception. The nr_contexts member specifies the number of contexts required by the operation. The context_table pointer points to an array of context structures, as defined below, each of which points to the name of a context.

The param structure 605 contains the description of one parameter belonging to an operation. Contents of the structure are derived from the CIN description of the interface. For operations that return a value function-style, a first param structure 79 describes the return value. The param structure 605 contains the following fields:

direction;
*prep;
alignment;
req_offset;
rsp_offset;
size;

The direction member indicates the direction of the parameter. The prep pointer holds the prepared CIN description of the parameter as generated by the PCU_PREPARE function. The PCU_PREPARE function is used to prepare individual data types based upon a CIN description of the data type. The PCU_PREPARE function is called by the GLU_INTERFACE_PREPARE function. The alignment is the required alignment of the parameter (e.g., 1, 2, 4, or 8 bytes). The req_offset member is the offset of the parameter within the request structure. The rsp_offset is the offset of the parameter within the response structure. The size member specifies the size of the parameter in bytes including padding bytes but without appendages.

The except structure 607 contains the description of an exception that can be raised by an operation. The structure contains the following fields:

*prep;
alignment;
size;

The prep pointer points to the address of the prepared CIN description of the exception structure as generated by PCU_PREPARE. The alignment member is the required alignment of the exception structure (e.g., 2, 4, or 8 bytes). The size member indicates the size of the exception structure in bytes including padding bytes but without appendages.

The context structure 609 describes one of the contexts required by an operation. The structure contains only a single name field. The name pointer points to an address containing the name of the context.

To obtain the length of the prepared interface description that will be produced by GLU_INTERFACE_PREPARE, the client application can call GLU_INTERFACE_PREPARE_LENGTH. Obtaining the length of the interface can be useful if the memory for the prepared CIN description will be allocated dynamically. GLU_INTERFACE_PREPARE_LENGTH is defined in C as follows:

| GLU_INTERFACE_PREPARE_LENGTH ( | |
|---|---|
| const char | *cinbuf; |
| long | cinlen, |
| long | *prep_len); |

The parameter cinbuf points to the address containing the generated CIN description of the interface. The field cinlen is the size of the CIN description contained in cinbuf. The output parameter prep_len returns the size of the prepared Cin that will be produced by GLU_INTERFACE_PREPARE.

To perform an object call, after the prepared CIN is generated, the client application puts a request and any necessary headers into a message buffer for transmission to a server. First the client application sets up the request by filling the request data structure (generated by the code generator and contained in the header file) with the appropriate input parameters and input/output parameters to the operation. The request data structure is then packed by calling the function GLU_CLIENT_REQUEST_PACK, which is defined in C as follows:

| GLU_CLIENT_REQUEST_PACK ( | |
|---|---|
| const void | *prep, |
| long | local_op_idx, |
| const void | *request, |
| long | max_msglen, |
| void | *msgbuf, |
| long | *msglen); |

The prepared CIN description, as returned by GLU_INTERFACE_PREPARE is stored in the address pointed to by prep. The parameter local_op_idx specifies the operation being requested. As stated above, a constant is generated for each operation. The request parameter is the generated structure containing the request structure filled by the client. The request structure, as stated above, contains the operation's input and input/output arguments. The maximum number of bytes that can be accommodated by the message buffer to receive the request and headers is specified by max_msglen. The packed headers and request data structure are stored in the address pointed to by msgbuf. The actual number of bytes written to msgbuf is stored in the address pointed to by msglen.

The request structure is packed by the GLU function using a function from a run-time library. The function, PCU_PACK, packs an individual data structure. PCU_PACK converts a CIN description of a particular data structure to an array whose elements include the type, offset, alignment, and size of the data structure. Alignment padding bytes are removed and data structures are packed based upon the client computer's method of alignment, thus allowing the server application to "make it right" if necessary. Both the client and the server computer have access to the specific alignment rules. The specific method for packing individual data structures using PCU_PACK is described in detail in U.S. application Ser. No. 08/680,203, filed Jul. 11, 1996.

The message buffer is then transmitted to the server using any known transport mechanism. On the server side, the server has previously called GLU_INTERFACE_PREPARE to obtain a prepared CIN description of the interface. The function GLU_SERVER_REQUEST_UNPACK is used by the server application to extract the request from a request message sent by the client. The function is defined as follows:

| GLU_SERVER_REQUEST_UNPACK ( | |
|---|---|
| const void | *prep, |
| const void | *msgbuf, |
| long | msglen, |
| long | max_request_len, |
| void | *request, |
| long | *request_len |
| long | *local_op_idx); |

The prep parameter contains the prepared CIN description as returned by GLU_INTERFACE_PREPARE. The received message and the number of bytes in the message are stored in the addresses pointed to by msgbuf and msglen, respectively. The maximum number of bytes that can be accommodated by the request structure is specified by max_request_len. The received request, including the client's prepared CIN and input parameters, is returned and stored in the address specified by request. The number of bytes written to the request address is specified by request_len. The parameter local_op_idx gets an index that indicates the requested operation.

The request is unpacked by the server by calling a PCU function in the run-time library called PCU_UNPACK which unpacks individual data structures.

The server invokes the proper method by comparing the operation_synopsis of the client's prepared CIN and the server's prepared CIN. Since the operation_synopsis is unique for each operation, a match indicates that the operations are the same. Next, the operation_id is evaluated to determine the correct method to invoke. Thus, if the server updates the interface by, for example, adding a new parameter to an operation, an error will occur because the operation_synopsis for the server will change. Other operations in the interface are still accessible to the server.

The server responds to the client by calling a function to pack a generated response structure and corresponding headers into a message buffer. The client first provides the appropriate function result, output parameters, and input/output parameters in the response data structure. The client then calls the function GLU_SERVER_RESPONSE_PACK, defined as follows:

| GLU_SERVER_RESPONSE_PACK | |
|---|---|
| const void | *prep, |
| long | local_op_idx, |
| const void | *response, |
| long | max_msglen, |
| void | *msgbuf, |
| long | *msglen); |

The repeated parameters are similar to their counterparts in GLU_CLIENT_REQUEST_PACK. The response parameter points to the address storing the response structure. The response structure contains the operation's function result, output arguments, and input/output arguments. The operation's output arguments form a variant in a union for the non-error case.

The client unpacks the response using GLU_CLIENT_RESPONSE_UNPACK which extracts the response structure from the message returned from a server. GLU_CLIENT_RESPONSE_UNPACK is defined as follows:

| GLU CLIENT_RESPONSE_UNPACK ( | |
|---|---|
| const void | *prep, |
| long | local_op_idx, |
| const void | *msgbuf, |
| long | msglen, |
| long | max_response_len, |
| void | *response, |
| long | *response_len); |

The parameters are similar to their counterparts in GLU_SERVER_REQUEST_UNPACK. The response address contains the unpacked response.

Figure 7:
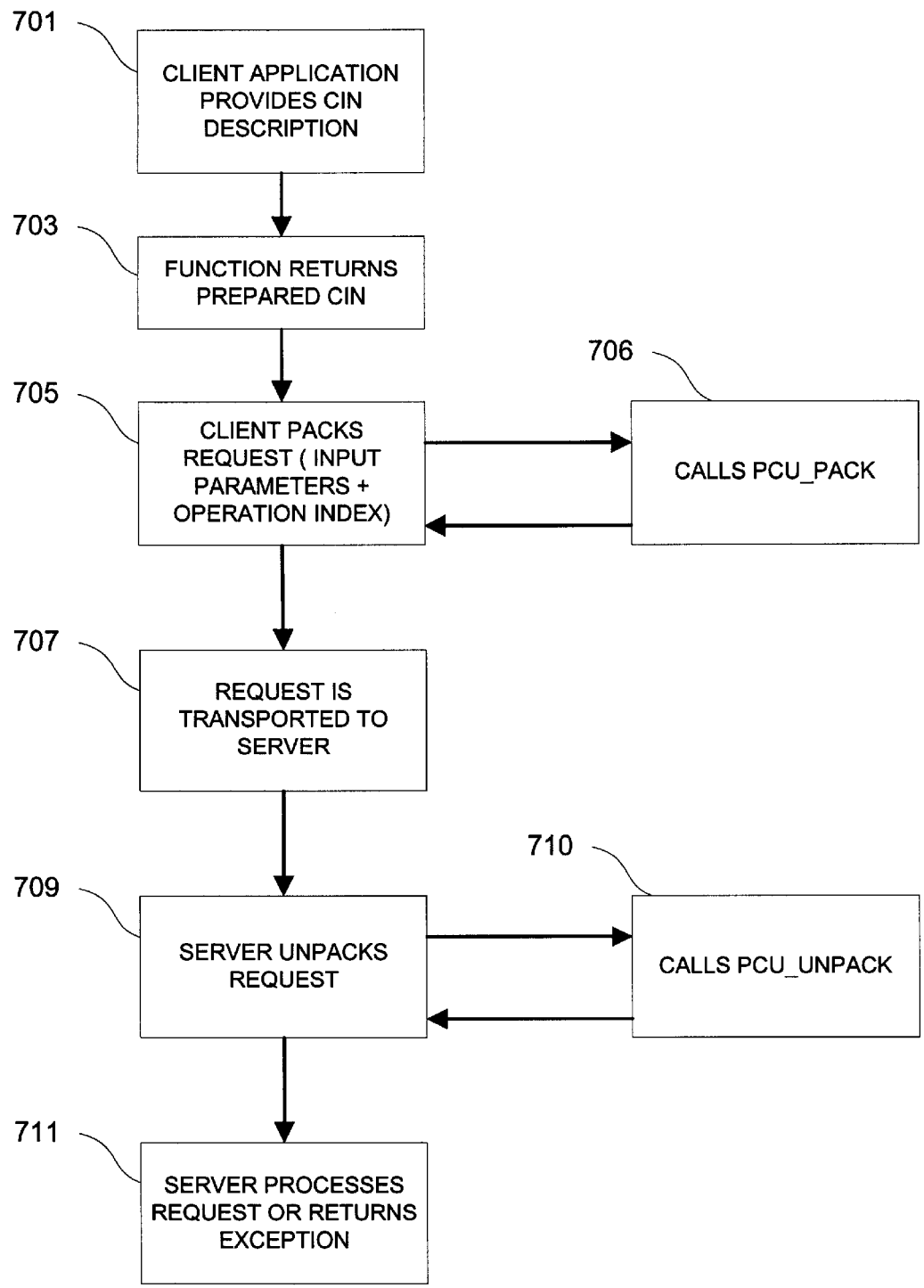
FIG. 7 is a flow chart showing an embodiment of the method of the present invention.

Now, with reference to the flow chart in FIG. 7, the method of the present invention will be described utilizing the above-mentioned functions. The present invention assumes that the CIN description has been generated by the code generators 701. In a first step 701, the client application calls GLU_INTERFACE_PREPARE using the CIN description as a parameter. GLU_INTERFACE_PREPARE, in step 703, returns the prepared CIN interface description in the form shown in FIG. 3. In step 705, the client calls GLU_CLIENT_REQUEST_PACK to pack the request. The client provides the generated request structure containing the operation's input parameters, an operation index, and the prepared CIN description. The call to GLU_CLIENT_REQUEST_PACK, in turn, calls PCU_PACK for each data structure contained therein. GLU_CLIENT_REQUEST_PACK returns a packed request. The packed request is then transported, in step 707, via any transport mechanism to the server application. Upon receipt, the server calls GLU_SERVER_REQUEST_UNPACK, in step 709. The server application provides the packed request and the prepared CIN, as returned by GLU_INTERFACE_PREPARE. (Both the server and client applications usually call GLU_INTERFACE_PREPARE during the respective initialization portions of each program.) The GLU_SERVER_REQUEST_UNPACK function calls PCU_UNPACK, in step 710, which unpacks each data structure in the request. The server then implements the requested operation on the object.

Figure 8:
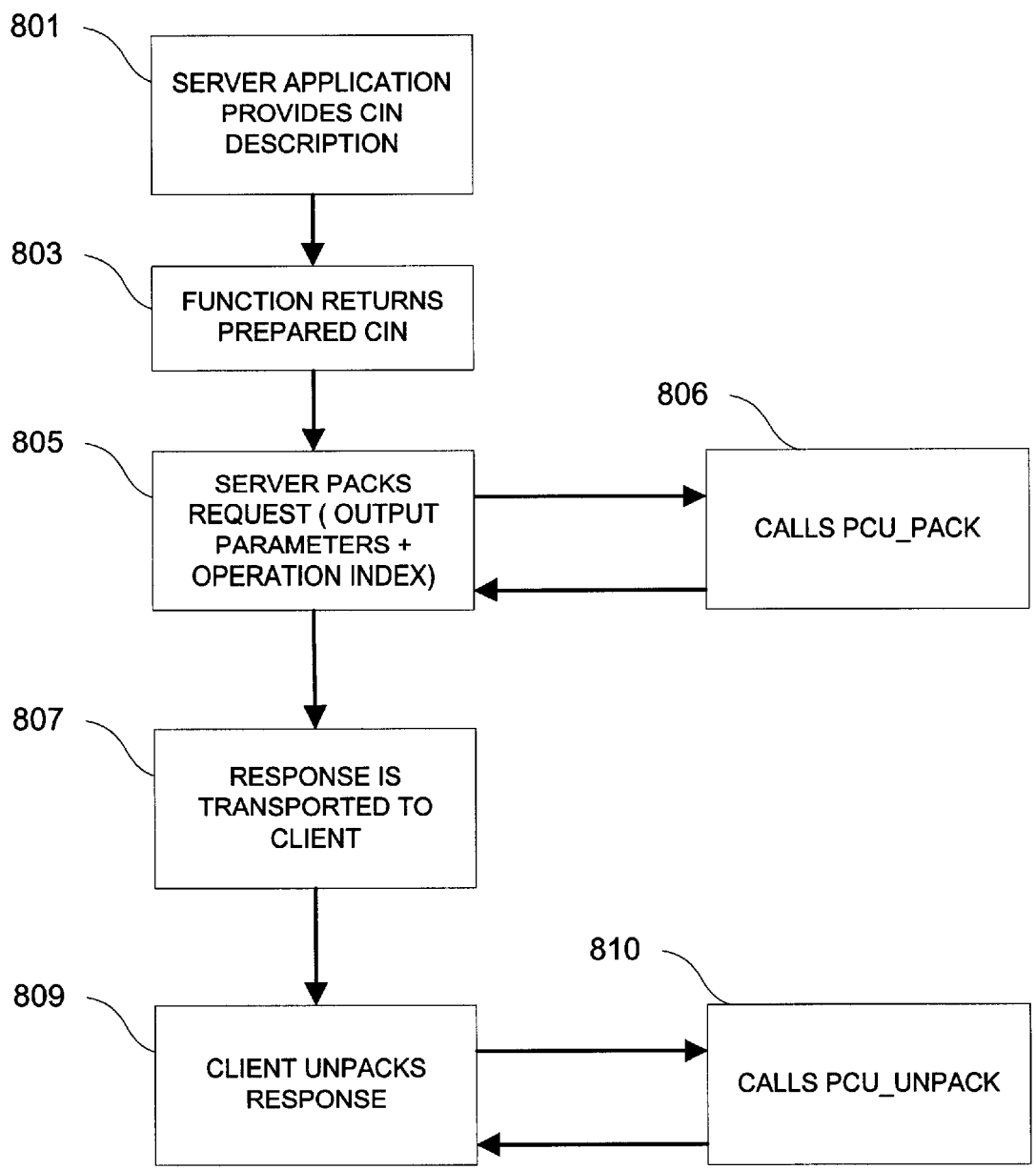
FIG. 8 is a flow chart showing another embodiment of the method of the present invention.

FIG. 8 shows how the server responds to the client. To respond to the client, the server calls (or has already called) GLU_INTERFACE_PREPARE which returns a prepared CIN description of the interface. The prepared CIN along with the response structure (containing the operation output and input/output parameters) and the operation index are provided to GLU_SERVER_RESPONSE_PACK in step 805. The function packs the response using PCU_PACK in step 806. The packed response, in step 807, is then transported back to the client using any transport mechanism. The client then calls GLU_CLIENT_RESPONSE_UNPACK and provides the packed response together with the operation index and the prepared CIN. The function unpacks the packed response in step 809.

In an alternative embodiment, CEE clients and servers communicate using calls to generated stubs. The CEE calls the appropriate GLU functions using a parameterized vector—an array of pointers to the parameters. Using an array of pointers rather than the actual parameters eliminates the need to formulate a structure to be packed. The use of parameterized vectors is described in U.S. application Ser. No. 08/678,681, attached as Appendix C.

Those functions are defined as follows:

| GLU_PV_CLIENT_REQUEST_PACK | |
|---|---|
| const void | *prep, |
| long | local_op_idx, |
| short | synch, |
| const void | *const *pv, |
| const void | *request, |
| long | max_msglen, |
| void | *msgbuf, |
| long | *msglen); |

| GLU_PV_SERVER_REQUEST_UNPACK ( | |
|---|---|
| const void | *prep, |
| const void | *msgbuf; |
| long | msglen, |
| long | max_request_len, |
| long | max_pv_len, |
| short | synch, |
| void | *request, |
| long | *request_len, |
| long | *local_op_idx, |
| void | **pv); |

| GLU_PV_SERVER_RESPONSE_PACK | |
|---|---|
| const void | *prep, |
| long | local_op_idx, |
| short | synch, |
| const void | *const *pv, |
| long | max_msglen, |
| void | *msgbuf, |
| long | *msglen); |

| GLU_PV_CLIENT_RESPONSE_UNPACK ( | |
|---|---|
| const void | *prep, |
| long | local_op_idx, |
| const void | *msgbuf, |
| long | msglen, |
| long | max_response_len, |
| short | synch, |
| void | *response, |
| long | *response_len; |
| void | **pv); |

Specifically, the four functions are similar to the previous packing/unpacking functions, except that two additional parameters are utilized. The first parameter, pv, is an array of pointers to the operation's parameters in the same order as they were specified in IDL. The first element of pv contains NULL or points to a long word containing the operation synopsis. If the first element points to a long word, that value is checked for consistency with the prepared CIN and the operation identifier. The other parameter, synch, if true, specifies that pv contains both input and output parameters. If synch is false, then pv contains only the addresses of the input parameters.

Having thus described a preferred embodiment of a method of making distributed object calls, it should be apparent to those skilled in the art that certain advantages of the within system have been achieved. It should also be appreciated that various modifications, adaptations, and alternative embodiments thereof may be made within the scope and spirit of the present invention. For example, a general method has been illustrated, but it should be apparent that the inventive concepts described above would be equally applicable to a media readable by a computer embodying specific instructions for causing the computer to perform these steps. The invention is further defined by the following claims.

What is claimed is:

1. A method of invoking an object from a client computer, the object implemented on a server computer, the method comprising:

accessing a compact interface definition language notation (CIN) definition of the object with the client computer;

modifying the CIN definition to create a prepared CIN definition using the client computer;

placing the prepared CIN definition, a request and a plurality of parameters into a buffer on the client computer using the client computer;

packing the buffer according to the prepared CIN definition; and sending the buffer to the server computer using a transport mechanism.

2. The method of claim 1, further comprising:

using the prepared CIN definition in the buffer to unpack the buffer on the server computer; and performing the request on the server computer.

3. The method of claim 2, further comprising:

accessing a second CIN definition of the object with the server computer;

modifying the second CIN definition to create a second prepared CIN definition using the server computer;

placing the second prepared CIN definition, a response and a second plurality of parameters into a second buffer on the server computer using the server computer;

sending the second buffer to the client computer using a second transport mechanism.

4. The method of claim 1, wherein the prepared CIN definition of the object is a string that encodes the type, size, and alignment of the plurality of parameters.

5. The method of claim 1, wherein the buffer includes an identifier for a call back procedure and wherein the client computer continues processing while the server computer asynchronously implements the object.

6. The method of claim 1, wherein the transport mechanism is a transmission control protocol over Internet protocol (TCP/IP) transport mechanism.

7. The method of claim 1, wherein the transport mechanism is an intra-memory copy transport mechanism.

8. The method of claim 1, wherein the transport mechanism is a non-TCP/IP transport mechanism.

9. A computer readable medium tangibly embodying a program of instructions implementing:

accessing a compact interface definition language notation (CIN) definition of an object with a client computer;

modifying the CIN definition to create a prepared CIN definition using the client computer;

placing the prepared CIN definition, a request and a plurality of parameters into a buffer on the client computer using the client computer;

packing the buffer according to the prepared CIN definition; and sending the buffer to a server computer using a transport mechanism.

10. The computer readable medium of claim 9, wherein said program of instructions further includes instructions implementing:

accessing a second CIN definition of the object with the server computer;

modifying the second CIN definition to create a second prepared CIN definition using the server computer;

placing the second prepared CIN definition, a response and a plurality of parameters into a second buffer on the server computer using the server computer;

packing the buffer according to the prepared CIN definition; and sending the buffer to the client computer using a second transport mechanism.

11. The computer readable medium of claim 9 wherein the prepared CIN definition of the object is a string that encodes the type, size, and alignment of the plurality of parameters.

12. The computer readable medium of claim 9, wherein the buffer includes an identifier for a call back procedure and wherein the client computer continues processing while the server computer asynchronously implements the object.

13. A client/server system comprising:

a server computer;

a client computer;

memory operably associated with said server computer and said client computer;

a program of instructions capable of being stored in said memory and executed by at least one of said client and said server, said program of instructions implementing;

accessing a compact interface definition language notation (CIN) definition of an object with the client;

modifying the CIN definition to create a prepared CIN definition using the client computer;

placing the prepared CIN definition, a request and a plurality of parameters into a buffer on the client computer using the client computer;

packing the buffer according to the prepared CIN definition; and sending the buffer to a server computer using a transport mechanism.

14. The client/server system as in claim 13, wherein said program of instructions further includes instructions implementing:

accessing a second CIN definition of the object with the server computer;

modifying the second CIN definition to create a second prepared CIN definition using the server computer;

placing the second prepared CIN definition, a response and a plurality of parameters into a second buffer on the server computer using the server computer;

packing the buffer according to the prepared CIN definition; and sending the buffer to the client computer using a second transport mechanism.

15. The client/server system as in claim 13 wherein the prepared CIN definition of the object is a string that encodes the type, size, and alignment of the plurality of parameters.

16. The client/server system as in claim 13, wherein the buffer includes an identifier for a call back procedure and wherein the client computer continues processing while the server computer asynchronously implements the object.

* * * * *